No. 738,768. PATENTED SEPT. 15, 1903.
J. A. BROWN.
AUTOMATIC WATERING TROUGH.
APPLICATION FILED JULY 19, 1901.
NO MODEL.
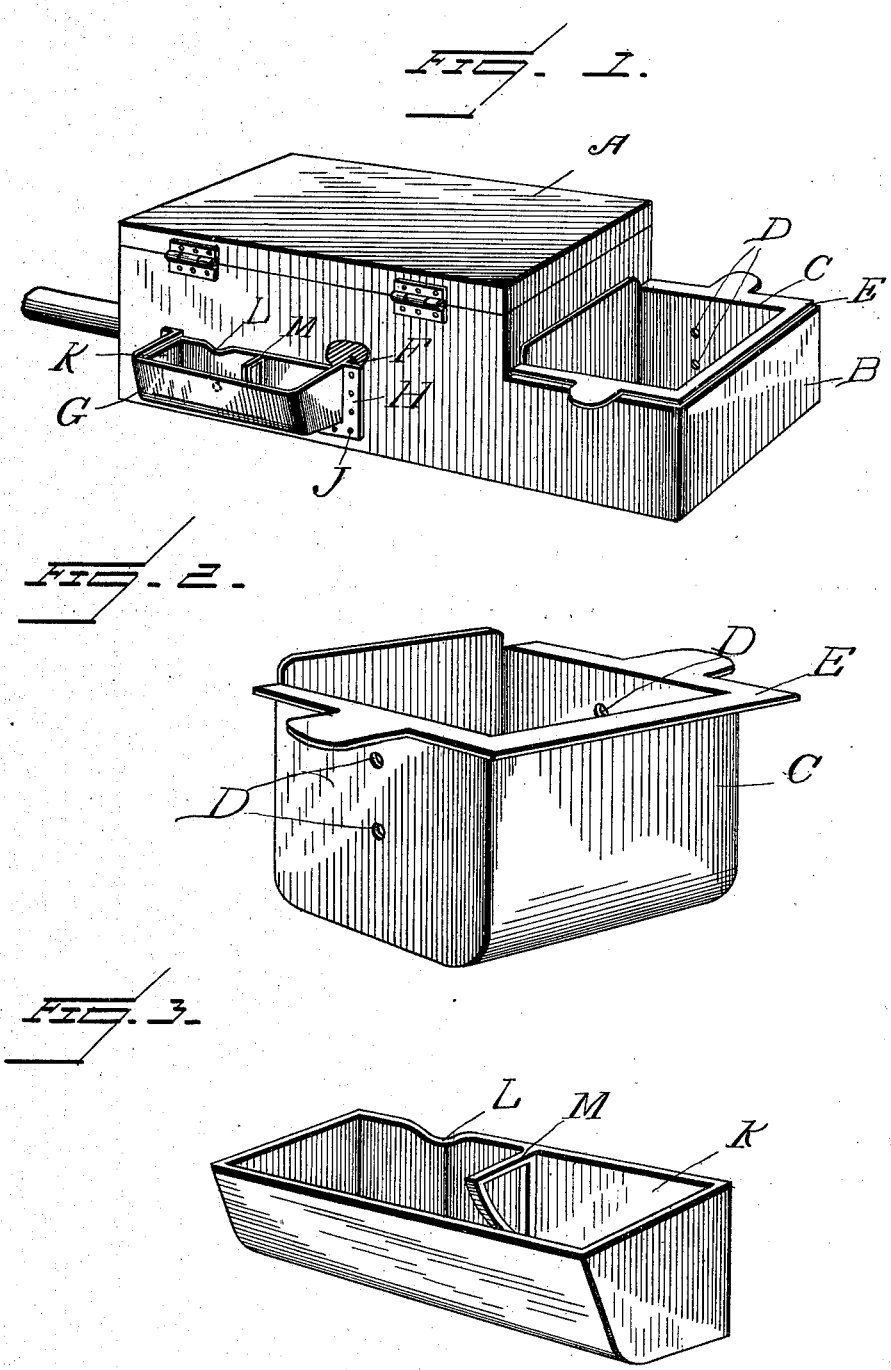
Witnesses
R. G. Boswell.
Theodore Dalton.
Inventor
James A. Brown
by M. J. Manahan
Attorney No. 738,768. Patented September 15, 1903.

UNITED STATES PATENT OFFICE.

JAMES A. BROWN, OF SUBLETTE, ILLINOIS.

AUTOMATIC WATERING-TROUGH.

SPECIFICATION forming part of Letters Patent No. 738,768, dated September 15, 1903.

Application filed July 19, 1901. Serial No. 68,962. (No model.)

*To all whom it may concern:*

Be it known that I, JAMES A. BROWN, a citizen of the United States, residing at Sublette, in the county of Lee and State of Illinois, have invented certain new and useful Improvements in Automatic Watering-Troughs; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to automatic watering-troughs; and it consists of certain improvements on the construction for which on July 5, 1892, Letters Patent of the United States No. 478,397 and on December 10, 1895, Letters Patent of the United States No. 551,027 were granted to me.

It is my object in my improvements to provide the watering-trough proper with a removable inner chamber or lining and attach to the side of the reservoir a smaller watering-trough especially adapted for watering poultry. The latter trough I also provide with an inner lining.

As my troughs were previously constructed the watering-trough proper would become filled with straw, mud, and other like material, which caused the water to become foul and which, owing to the shape of the trough, was very difficult to remove. The removable lining can be easily lifted out, cleansed, and returned to the trough, and the water thereby kept pure and clean.

My trough is also constructed in such a manner that the part for watering the animals can be placed through a fence into the stockyard, the reservoir remaining on the opposite side beyond their reach. My object in placing the additional fountain for the poultry on the side of the reservoir is to give them a separate drinking-place beyond the reach of the stock. I attain these advantages by the construction shown in the accompanying drawings, in which—

Figure 1 is a perspective of my trough, showing the connecting-pipe to the main reservoir, the reservoir containing the valve-chamber and the watering-trough for the stock and drinking-fountain for the poultry. Fig. 2 is a perspective of the removable lining of said trough. Fig. 3 is a perspective of the lining of the poultry-fountain.

Similar letters refer to similar parts in the several views.

A is the reservoir containing the valve-chamber, and B the watering-trough, the two parts being separated by a partition having suitable openings therein for the passage of the water from A to B.

C is the inner chamber or lining, so constructed as to allow the passage of the water between its outer faces and the inner faces of the trough B.

D D are orifices in the sides of the chamber C to permit the water to pass into it.

Flange E extends around the upper edges of chamber C, holding said chamber in place in the trough B, keeping the hogs from gnawing or injuring the wood and also preventing dirt or other impurities from passing into the trough. The flange E is provided with extended lips e to furnish handles for grasping the chamber C when desiring to remove it for cleansing.

Referring to the chicken-fountain, the part G, of suitable shape and size, is secured to the side of the reservoir A at any desirable point by means of the screws and screw-holes J in the flange H. A V-shaped ridge F extends around the sides and bottom of the trough G and projects outwardly at right angles to the flange H to be embedded in the sides of the reservoir A and prevents leakage. An opening is made in the side of the said reservoir to allow the inlet of the water. The inner chamber K is for the same purpose as the chamber C, but sets in the outer casing G, a depression being made in its inner wall at L, which is placed opposite the opening in the side of the reservoir. The water flows up through the passage-way thus formed into the casing G.

M is an extension cast in the wall of the chamber K, by which to remove it.

The parts C, G, and K are preferably made of cast-iron and may be of any suitable size and shape to answer the purposes hereinbefore set forth.

To attach the trough G to the reservoir A, the V-shaped ridge F, which projects from the inner margin of the trough at right angles to the flange H, is forced into the wood until the flange H is flush with the outer surface of the reservoir, and screws J are then screwed into the wood. This ridge F forms a water-tight joint and prevents the escape of water between the reservoir and the trough.

What I claim as my invention, and desire to secure by Letters Patent of the United States, is—

1. In an automatic watering-trough the combination with a reservoir, of a trough provided with a marginal flange and an offset ridge extended beyond the side of the flange to be embedded in the sides of the reservoir, a removable lining for the trough having a conduit for the water and a handle to permit the removal of the lining, substantially as described.

2. In an automatic watering-trough, the combination of the casing G, the inner chamber K removably seated therein, the depression L on the wall of the chamber K, an opening in the side of the reservoir A, the reservoir A, and means for removing the chamber K from the casing G substantially as shown and for the purpose described.

In testimony whereof I affix my signature in the presence of two witnesses.

JAMES A. BROWN.

Witnesses:
 JACOB B. BARTON,
 W. E. BROWN.